United States Patent [19]

Morinaga et al.

[11] Patent Number: 4,511,827
[45] Date of Patent: Apr. 16, 1985

[54] APPARATUS FOR DRIVING A POLYPHASE BRUSHLESS MOTOR WITH A SUPPRESSED TORQUE RIPPLE

[75] Inventors: Shigeki Morinaga; Kunio Miyashita, both of Hitachi; Yasuyuki Sugiura, Takahagi, all of Japan

[73] Assignee: Hitachi, Ltd., Tokyo, Japan

[21] Appl. No.: 404,646

[22] Filed: Aug. 3, 1982

[30] Foreign Application Priority Data

Aug. 3, 1981 [JP] Japan ................................ 56-120734
Oct. 6, 1981 [JP] Japan ................................ 56-158087

[51] Int. Cl.³ ............................................. H02P 7/28
[52] U.S. Cl. ...................................... 318/254; 318/721
[58] Field of Search ............................... 318/798-811, 318/720-724, 254

[56] References Cited

U.S. PATENT DOCUMENTS

| 4,137,489 | 1/1979 | Lipo | 318/722 |
| 4,215,305 | 7/1980 | D'Atr et al. | 318/808 |
| 4,240,020 | 12/1980 | Okuyama et al. | 318/722 |
| 4,298,831 | 11/1981 | Espelage et al. | 318/802 |
| 4,311,951 | 6/1982 | Walker et al. | 318/803 |
| 4,314,190 | 2/1982 | Walker et al. | 318/802 |

Primary Examiner—E. A. Goldberg
Assistant Examiner—A. Evans
Attorney, Agent, or Firm—Antonelli, Terry & Wands

[57] ABSTRACT

An apparatus for driving a polyphase brushless motor with a resulting torque ripple effectively suppressed. The apparatus comprises a rotor position sensor, a controller responsive to the output of the sensor for generating a control signal and an inverter serving to conduct electric current to each phase of the motor as a result of commutation under control of the control signal from the controller. The controller is particularly provided with a device for increasing the value of integration of the electric current for each phase of the motor with respect to time as measured from the instant of switching among motor phase currents effected with the control signal.

14 Claims, 10 Drawing Figures

PRIOR ART

APPARATUS FOR DRIVING A POLYPHASE BRUSHLESS MOTOR WITH A SUPPRESSED TORQUE RIPPLE

The present invention generally relates to an apparatus for driving a polyphase brushless motor and in particular concerns an apparatus provided with an inverter of a pulse width modulation type for driving the polyphase brushless motor while suppressing a torque ripple to minimum.

In general, the driving of the brushless motor is carried out with the aid of an inverter, the commutating operation of which is controlled by control signals prepared on the basis of the signals derived through detection of the rotor position in the polyphase brushless motor. In such driving system of the brushless motor, it is known that the motor torque suffers a ripple ascribable to the switching or change-over among the phase currents of the motor through the commutating operation of the inverter. Accordingly, when the brushless motor is employed as a servomotor for a numerical control system of machine tools or the like, for example, the quality of the worked products will possibly be degraded to a disadvantage.

An object of the present invention is to provide an apparatus for driving a polyphase brushless motor, which apparatus includes an inverter of a pulse width modulation type and is capable of suppressing torque ripple ascribable to the switching among the phase currents of the brushless motor realized through commutation of the inverter.

According to the primary aspect of the invention, the commutating operation of the inverter is controlled by control signals produced by a controller which includes means for inceasing the value of integration of each phase current of a polyphase brushless motor with respect to time between two instants of successive commutation at each of which the switching of the phase currents takes place, for the purpose of effectively suppressing the torque ripple ascribable to the switching of the phase currents of the motor effected through the commutating operation of the inverter.

In the following, the invention will be described in conjunction with several preferred embodiments thereof by referring to the accompanying drawings, in which.

For a better understanding of the present invention, description will first be made on a hitherto known apparatus for driving a polyphase brushless motor by referring to FIGS. 1 to 3. A typical example of such driving apparatus is disclosed, for example, in Japanese Patent Application Laid-Open No. 86078/1981 (Japanese Patent Application No. 161461/1979) laid open on July 13, 1981.

Figure 1:
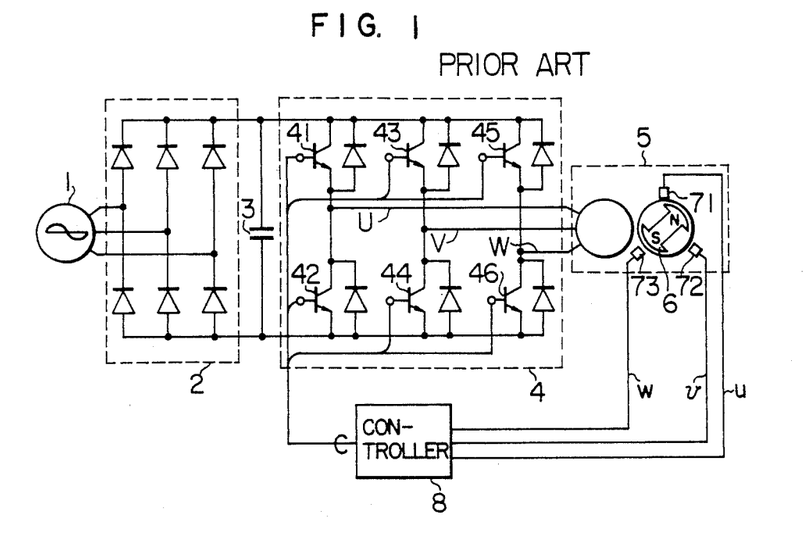
FIG. 1 is a circuit diagram of a conventional driving apparatus provided with an inverter of a pulse width modulation type for driving a polyphase brushless motor.

Referring to FIG. 1, the apparatus for driving a polyphase brushless motor 5 includes rotor position detectors 71 to 73 for detecting angular position of a rotor 6 of the motor 5, a controller 8 for producing a commutation signal in response to the signals outputted by the detectors 71 to 73, and an inverter 4 for conducting current supplied from an A.C. power source 1 selectively to each phase of the motor 5 by switching the phase currents of the motor 5 under the control of the commutation signal supplied from the controller 8. Reference numerals 2 and 3 denote, respectively, a rectifier for converting the A.C. current supplied from the power supply source 1 to D.C. current and a capacitor for smoothing the output current of the rectifier 2 for supplying the smoothed D.C. current to the inverter 4. By way of example, the inverter 4 may be composed of six transistors 41 to 46 and flywheel diodes each connected across the collector-emitter path of the associated transistor in an opposite polarity connection. More specifically, the transistors 41 to 46 are connected in such a circuit arrangement that when any one of the transistors 41, 43 and 45 is made conductive, then one of the transistors 42, 44 and 46 is switched to the conducting state to supply the current to two phases of the polyphase brushless motor 5, as will be hereinafter described in more detail. The rotor position detectors 71 to 73 may be constituted by, for example, Hall elements or photoelectric elements and are disposed around the rotor 6 with an angular distance of 120° with respect to the rotational angle of the rotor 6.

Figure 2:
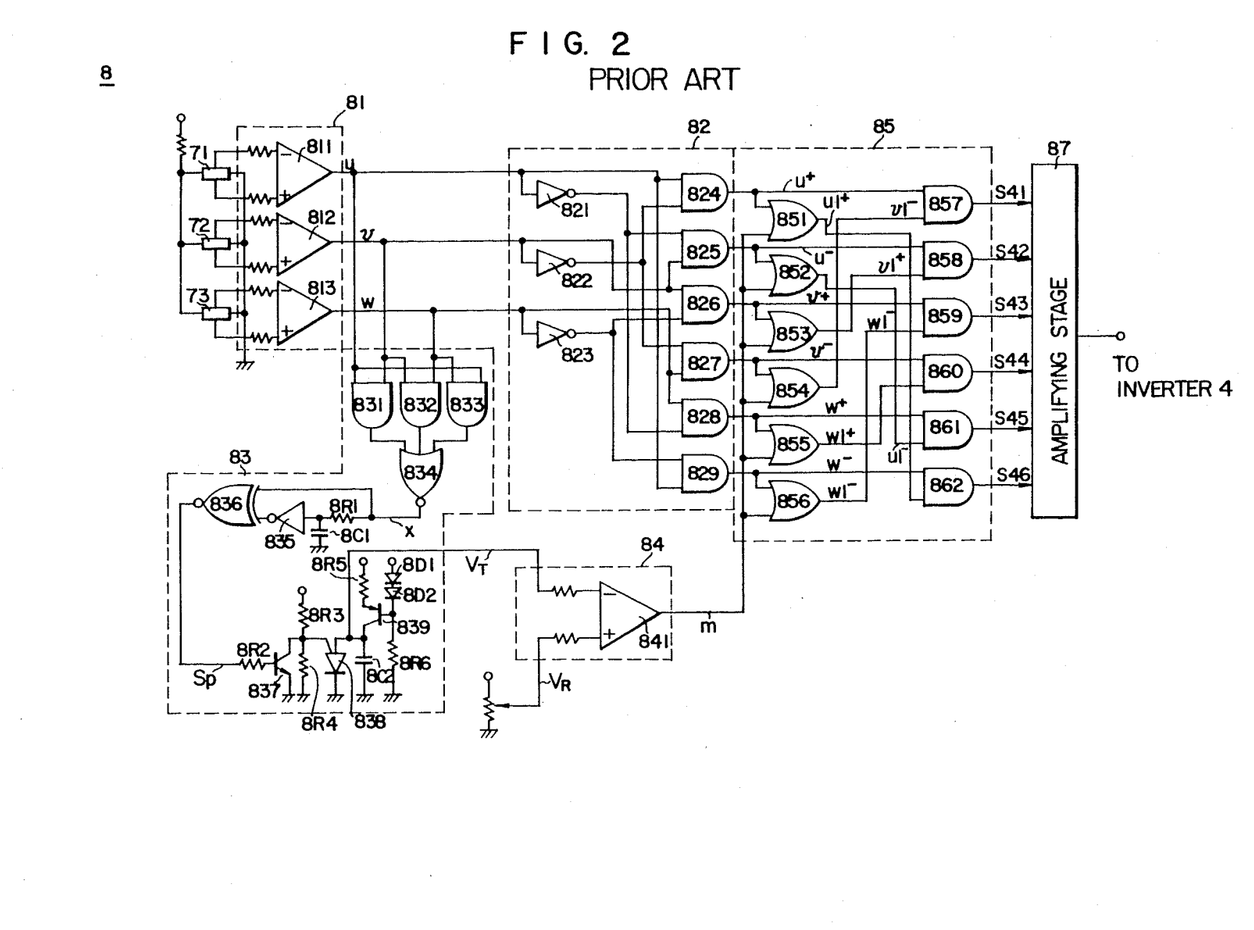
FIG. 2 is a circuit diagram showing an example of a circuit configuration of a hitherto known controller used in the driving system shown in FIG. 1.

A circuit arrangement of the controller 8 is shown in detail in FIG. 2. Referring to this figure, the output signals of the detectors 71, 72 and 73 are supplied to a waveform shaping circuit 81 which produces position detecting signals u, v and w. A circuit 83 for generating a carrier such as, for example, a carrier of triangular waveform and distributor circuit 82 are connected in common to the output terminal of the waveform shaping circuit 81. The triangular wave generating circuit 83 has the output terminal to which a modulation signal forming circuit 84 is connected, which circuit 84 in turn has the output terminal connected to a commutation signal generating circuit 85. This circuit 85 serves to prepare the signal for each of the transistors 41 to 46 of the inverter 4, i.e. the commutation signal on the basis of the signal delivered from the distributor circuit 82 and the output signal of the modulation signal forming ciruit 84. The output signal from the commutation signal generating circuit 85 is supplied to an amplifying stage 87 which serves to amplify the output signal from the commutation signal generating circuit 85 to supply the commutation signal to the bases of the transistors of the inverter 4.

Figure 3:
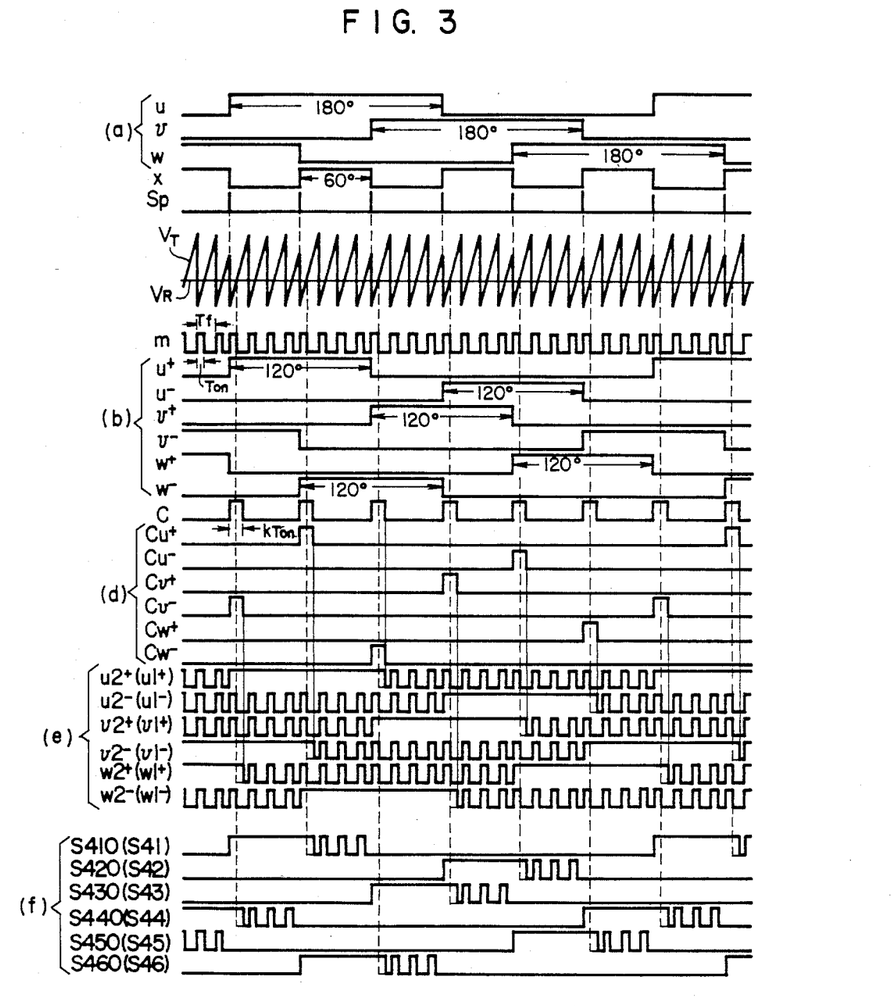
FIG. 3 is a waveform diagram illustrating waveforms of several signals observed in the apparatus shown in FIGS. 2 and 5.

Describing further the arrangement of the individual components shown in FIG. 2 by also referring to FIG. 3, the waveform shaping circuit 81 supplied with the output signals of the detectors 71 to 73 includes differential amplifiers 811, 812 and 813 which receive the output signals of the detectors 71, 72 and 73 by way of respective resistors and produce the position detecting signals u, v and w of a rectangular waveform, respectively, each having a duration or width corresponding to the electrical angle of 180°, as is illustrated in FIG. 3 (a).

The distributor circuit 82 includes NOT circuits 821, 822 and 823 and AND circuits 824, 823, . . . , and 829. More particularly, the output end of the differential amplifier 811 of the waveform shaping circuit 81 is connected to one input terminal of the AND circuit 824 which has the other input terminal connected to the output end of the differential amplifier 812 by way of the NOT circuit 822. Further, the output end of the differential amplifier 811 is connected to first input terminals of the AND circuits 825 and 828, respectively, by way of the NOT circuit 82. The AND circuit 825 has the second input terminal connected to the output end of the differential amplifier 812, while the second input terminal of the AND circuit 828 is connected to the output end of the differential amplifier 813. Further, the output end of the differential amplifier 812 is connected to a first input terminal of the AND circuit 826 which has the second input terminal connected to the output end of the differential amplifier 813 by way of the NOT circuit 823 having the output end connected to a first input terminal of the AND circuit 829. The second input terminal of the AND circuit 829 is connected to the output of the differential amplifier 811. The differential amplifier 813 has the output end connected to a first input terminal of the AND circuit 827 which has the second input terminal connected to the output end of the differential amplifier 812 by way of the NOT circuit 822. Accordingly, the distributor circuit 82 produces as the output signals thereof the basic signals each having a conduction angle of 120° for each phase of the motor, as is illustrated by waveforms u+, u−, v+, v−, w+ and w− in FIG. 3.

On the other hand, the triangular waveform generating circuit 83 includes AND circuits 831, 832 and 833, a NOR circuit 834, an Exclusive-NOR circuit 836, a NOT circuit 835, a unijunction transistor 838, transistors 837 and 839, resistors 8R1, 8R2, . . . and 8R6, capacitors 8C1 and 8C2 and diodes 8D1 and 8D2. Two input terminals of the AND gate 831 are connected to the output ends of the differential amplifiers 811 and 812, respectively. Two input terminals of the AND circuit 832 are connected to the output ends of the differential amplifiers 812 and 813, respectively. Two input terminals of the AND circuit 833 are connected to output ends of the differential amplifiers 813 and 811, respectively. The output terminals of the AND circuits 831, 832 and 833 are connected to three input terminals of the NOR circuit 834, respectively. The output signal x of the NOR circuit 834 is a pulse signal having a pulse width or duration corresponding to the electrical angle of 120° for deriving therefrom a synchronizing pulse Sp having a duration corresponding to the electrical angle of 60° as illustrated in FIG. 3 at Sp. The resistor 8R1, capacitor 8C1, NOT circuit 835 and the Exclusive-OR circuit 836 constitute a circuit for detecting the rising edge and the falling edge of the signal x mentioned above to derive the synchronizing pulse Sp. The above-mentioned triangular wave generating circuit 83 which is initialized by the synchronizing pulse signal Sp produces a triangular pulse signal shown in FIG. 3 at $V_T$ which is applied to the input of the modulation signal forming circuit 84.

The modulation signal forming circuit comprises a comparator 841 which has a negative (−) input terminal supplied with the output signal (the triangular wave signal $V_T$ shown in FIG. 3) from the triangular wave generating circuit 83 and a positive (+) input terminal which is supplied with a preset voltage value $V_R$ shown in FIG. 3. The comparator 841 produces as the output signal a modulation signal such as shown in FIG. 3 at m which is then supplied to the commutation signal generating circuit 85.

The commutation signal generating circuit 85 comprises OR circuits 851, 852, . . . and 856 and AND circuits 857, 858, . . . and 862. These OR circuits 851 to 856 have first input terminals which are connected in common to the output terminal of the comparator 841 of the modulation signal forming circuit 84 and second input terminals which are connected to the output terminals of AND circuits 824, 825, . . . and 829, respectively. Additionally, the output terminals of the AND circuits 824, 825, . . . and 829 are connected to first input terminals of the AND circuits 857 to 862, respectively, which have, respectively, the second input terminals connected to the output terminals of the OR circuit 854, 853, 856, 855, 852 and 851, respectively. In the commutation signal generating circuit 85, the output signals of the OR circuits 851 to 856 have waveforms u1+, u1−, v1+, v1−, w1+ and w1− shown at (e) in FIG. 3. The signals of these waveforms result from the logic product of the output signals from the AND circuits 824 to 829 of the distributor circuit 82, i.e. the signal of the waveforms u+, u−, v+, v−, w+ and w− shown at (b) in FIG. 3 and the signal having the waveform m shown in FIG. 3 outputted from the modulation signal forming circuit 84. Accordingly, it should be understood that each end of the broad width pulses corresponds to a vertical dotted line rather than the solid line. The output signals of the AND circuits 857 to 862, i.e. the output signals of the commutation signal generating circuit 85 are thus such as indicated by S41, S42 . . . and S46 in FIG. 3 at (f). In this case, the ends of the wide pulses also correspond to the vertical dotted lines. These commutation signals S41, S42, . . . and S46 are amplified by the amplifying stage 87 and applied to the transistors 41, 42, . . . and 46 of the inverter 4 shown in FIG. 1 for effecting the commutation.

Figure 4:
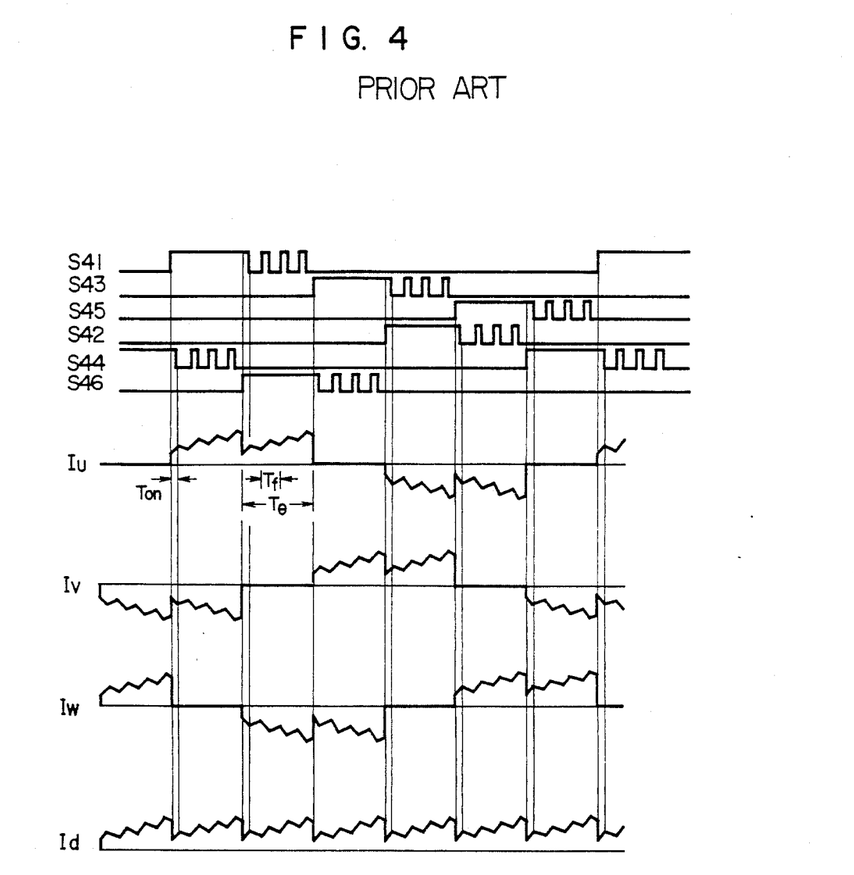
FIG. 4 is a waveform diagram illustrating waveforms of output signals of the hitherto known controller shown in FIG. 2 together with phase currents of a three-phase brushless motor driven by the system shown in FIG. 1 incorporating the known controller.

FIG. 4 shows waveforms of the commutation signals S41, . . . , S46 and phase currents supplied to phases U, V and W of the motor 5 as the result of the commutating operation of the inverter 4 effected on the basis of these commutation signals. For varying the number of rotation of the motor 5 with the aid of the commutation signals S41 to S46, the output voltage of the inverter is controlled by regulating the voltage $V_R$ set at the modulation signal forming circuit 84 to thereby vary the duration of the modulation signal m and hence the conduction ratio (duty cycle) $D_t = T_{on}/T_f$. When the inverter 4 is operated in accordance with the commutation signals, the phase currents of the motor 5 undergo such variations as shown in FIG. 4. As will be apparent from FIG. 4, the commutation signals S41 to S46 are supplied to the inverter 4 from the controller 8, as the result of which control signals each including a plurality of pulse trains are applied to the inverter 4. In FIG. 4, each pulse train of each control signal mentioned above (rather than the commutation signals) is shown as including four pulses.

In FIG. 4, $I_U$, $I_V$ and $I_W$ represent the phase currents flowing to the phase windings U, V and W of the motor 5, and $I_d$ represents a sum of the absolute values of the phase currents $I_U$, $I_V$ and $I_W$ and hence the input current to the motor 5. The ripple or pulsating components of the input current include a component of high frequency ascribable to the aforementioned modulation signal m and a component of low frequency which accompanies the switching of the phase currents supplied to the individual phase windings of the motor 5. The former component has a period $T_f$ shown in FIG. 4 which is usually constant and does not exceed 2 m sec in most cases, while the period $T_\theta$ of the latter component shown in FIG. 4, i.e. the switching period of the phase current undergoes significant variations in dependence on the number of rotation of the motor 5 as employed. For example, when the rotational speed of a motor of four poles is varied from 10 rpm to 1000 rpm, the period $T_\theta$ varies from 0.5 sec. to 5 m sec. At that time, there are produced torque ripples in a range from 2 Hz to 200 Hz, giving rise to pulsations in the number of rotation. This is what is referred to as the torque ripples of the brushless motor produced upon commutation.

With the present invention, it is contemplated to provide an apparatus for driving a polyphase brushless motor which apparatus is capable of reducing the torque ripple of the polyphase brushless motor and the pulsation in the rotational number thereof. In the following, an exemplary embodiment of the present invention will be described by referring to FIG. 5.

Figure 5:
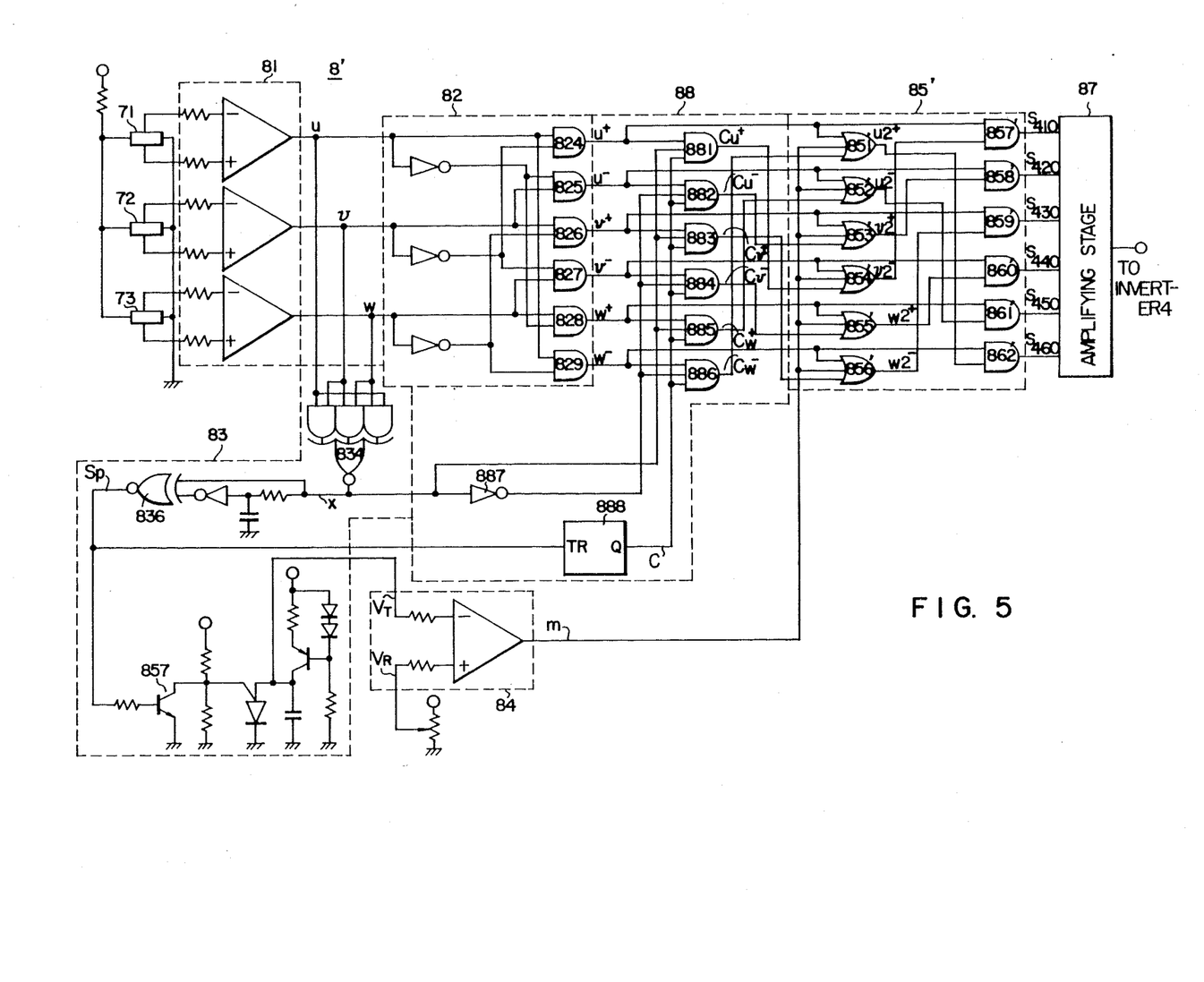
FIG. 5 is a circuit diagram showing a main portion of an embodiment of the invention.

In the case of the embodiment shown in FIG. 5, there is provided in the controller 8 of the driving apparatus shown in FIG. 1 means for increasing the duration of those pulses in the pulse trains of the control signals produced by the controller 8 which are utilized for effecting the commutation, to thereby increase the aforementioned conduction ratio, that is the values of integration of the individual phase currents with respect to time as measured from the switching time point of the phase current, with a view to suppressing the torque ripple mentioned above.

The following description of the instant embodiment will be directed to the construction and operation of the controller 8' shown in FIG. 5, commutating operation of the inverter 4 and the phase currents of the motor. Since other arrangements and operations are similar to those of the prior art apparatus, further description thereof will be omitted.

The controller 8' shown in FIG. 5 differs from the arrangement of the controller 8 shown in FIG. 2 in that a pulse duration extension circuit 88 (hereinafter referred to simply as the extension circuit) which operates in accordance with the output of the triangular wave generating circuit 83 is disposed between the distributor circuit 82 and the commutation signal generating circuit 85. Accordingly, circuit arrangements of the waveform shaping circuit 81, the distributor circuit 82, the triangular wave generator circuit 83, the modulation signal forming circuit 84 and the amplifying stage 87 are similar to those shown in FIG. 2. The waveforms of the outputs of the circuits 81, 82, 83 and 84 are same as those illustrated in FIG. 3 at u, v, w, $u^+$, $u^-$, $v^+$, $v^-$, $w^{30}$, $w^-$, x, $S_p$, $V_T$, $V_R$ and m.

The extension circuit 88 comprises AND circuits 881, 882, . . . and 886, a NOT circuit 887 and a one-shot multivibrator 888. The output terminal of the AND circuit 824 of the distributor circuit 82 is connected in common to a first input terminal of the AND circuit 881 of the extension circuit 88 and first input terminals of the OR circuit 851 and the AND circuit 857 of the commutation signal generating circuit 85'. In the similar manner, the output terminals of the AND circuits 825, . . . , 829 of the distributor circuit 82 are connected in common to first input terminals of the AND circuits 882, . . . , 886 of the extension circuit 88 and first input terminals of the OR circuits 852, . . . , 856 and the AND circuits 858, . . . , 862 of the commutation signal generator circuit 85', respectively. On the other hand, the output x of the NOR circuit 834 of the triangular wave generator circuit 83 is utilized not only for producing the synchronizing pulse $S_p$ as described hereinbefore in conjunction with FIG. 2 but also supplied to the NOT circuit 887 of the extension circuit 88 and the second input terminals of the AND circuits 881, 883 and 885, respectively. The output terminal of the NOT circuit 887 is also connected to the second input terminals of the AND circuits 882, 884 and 886, respectively. The above-mentioned synchronizing pulse $S_p$ outputted from the NOR circuit 876 of the triangular wave generator circuit 83 is utilized not only for generating the triangular wave $V_T$ as described hereinbefore in conjunction with FIG. 2 but also supplied to an input terminal TR of the one-shot multivibrator 888 of the extension circuit 88 in the case of the illustrated embodiment of the invention. The synchronizing pulse $S_p$ serves to define the timing in the commutating operation of the inverter, as is the case of the prior art shown in FIG. 2. The one-shot multivibrator 888 is triggered by this signal $S_p$ and produces an extension pulse signal C (refer to FIG. 3, the waveform C) which has a duration $k \cdot T_{on}$ corresponding to the duration $T_{on}$ of the modulation signal m produced by the modulation signal forming circuit 84 and multiplied by a factor k where $k > 1$. The one-shot multivibrator 888 has an output terminal Q which is connected in common to the third input terminals of the AND circuits 881, . . . , 886. As the consequence, output signals having waveforms $Cu^+$, $Cu^-$, $Cv^+$, $Cv^-$, $Cw^+$ and $Cw^-$ shown in FIG. 3 at (d) are produced from the AND circuits 881, . . . , 886 of the pulse duration extension circuit 88.

Each of the second input terminals of the OR circuits 851', . . . , 856' of the commutation signal generating circuit 85' is connected to the output of the modulation signal forming circuit 84, as is in the case of the prior art shown in FIG. 2. Further, the third input terminals of the OR circuits 851', . . . , 856' are connected to the output terminals of the AND circuits 886, 885, 882, 881, 884 and 883, respetively. Thus, the output signals having waveforms $u2^+$, $u2^-$, $v2^+$, $v2^-$, $w2^+$ and $w2^-$ shown in FIG. 3 at (e) are produced by these OR circuits 851', . . . , 856'.

Interconnections between the OR circuits 851', . . . , 856' and the AND circuits 857', . . . , 862' in the commutation signal generating circuit 85' are made in the manner shown in FIG. 2, whereby output signals having, respectively, waveforms S410, . . . , S460 shown in FIG. 3 at (f) are produced from the AND circuits 857', . . . , 862', respectively. As will be seen from the waveform diagrams shown in FIG. 3 at (d) and (e), durations of the broad width pulses of the waveforms $u2^+$, $u2^-$, ..., $w2^-$ outputted from the OR circuits 851', ..., 856', correspond to the products of the durations of the broad width pulses of the waveforms $u1^+$, $u1^-$, ..., $w1^-$ outputted from the OR circuits 851, ..., 856 shown in FIG. 2 and the factor k (k>1), respectively. Same applies valid to the output signals S410, ..., S460 of the AND circuits 857', ..., 862'.

Figure 6:
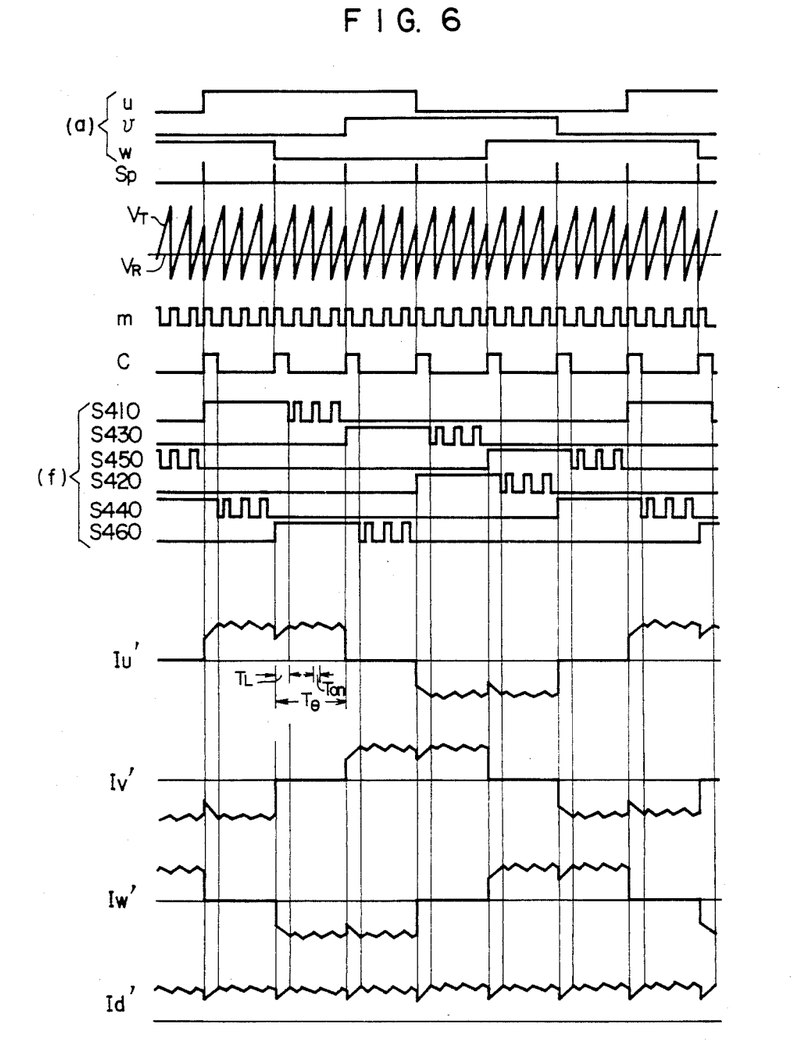
FIG. 6 is a waveform diagram illustrating waveforms of several signals observed in the controller according to the embodiment shown in FIG. 5 together with the phase currents of the motor produced in the apparatus provided with the controller shown in FIG. 5.

FIG. 6 shows waveforms of the commutation signals S410, ..., S460 obtained in the embodiment shown in FIG. 5, some of the signals shown in FIG. 3 on the basis of which the commutation signals are prepared, and the phase currents flowing to the phases U, V and W of the motor 5 as the result of the commutating operation of the inverter 4 effected in accordance with the commutation signal. For the same reason as explained hereinbefore in conjunction with FIG. 4, there are also produced from the commutation signals S410, ..., S460 supplied to the inverter 4 from the controller 8' three control signals each including a plurality of pulse trains in correspondence with the individual phase of the motor in the case of the instant embodiment, wherein each pulse train includes four pulses. Among these pulses, the first one is in synchronism with the synchronizing pulse $S_p$ and is utilized for effecting the commutating operation of the inverter 4. In the case of the illustrated embodiment of the invention, duration of the pulse used for the commutation and thus the duration or width $T_L$ of the torque ripple suppressing signal corresponds to the product of the pulse used for the commutation in the prior art apparatus, i.e. the duration $T_{on}$ and the multiplying factor k where k>1, as the result of which the values of the individual phase currents integrated as a function of time from the commutating time point of the inverter 4 is increased. Consequently, the current $I_d$ shown in FIG. 6, i.e. the sum of the absolute values $I_U$, $I_V$ and $I_W$ becomes such as shown in FIG. 6. The torque ripple is thus reduced with the pulsation in the rotational number of the motor being suppressed to a minimum.

Next, another embodiment of the present invention will be described by referring to FIG. 7. In the case of this embodiment, the D.C. voltage applied to the inverter is increased for a predetermined time interval starting from a time point synchronized with the initiation of that pulse of each pulse train of the control signal which is used for bringing about the commutation, when compared with the D.C. voltage applied to the inverter for the other part of time, for the purpose of suppressing the torque ripple. In other words, the value of time integration of each phase current of the motor is increased starting from a time point at which the phase currents of the motor are changed over, to thereby shorten the time required for the rise-up of each phase current.

Figure 7:
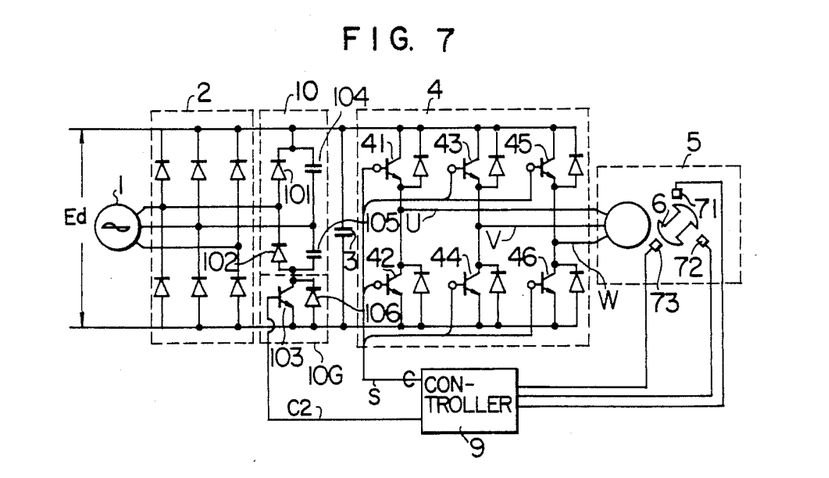
FIG. 7 is a view showing another embodiment of the invention.

In FIG. 7, the parts similar to those shown in FIG. 1 are denoted by the same reference symbols. A reference numeral 10 denotes a voltage doubler rectifier circuit connected to an A.C. power source 1 and composed of diodes 101 and 102 and capacitors 104 and 105 in a circuit configuration known per se in the art. A gate circuit 10G is connected between the voltage doubler rectifier circuit 10 and the inverter 4 and comprises a transistor 103 and a diode 106 connected across the collector-emitter path of the transistor 103 and serving for bypassing the backward voltage supplied from the motor 5 to protect the transistor 103. The controller 9 receives the output signal from the detectors 71, 72 and 73 and supplies a gate pulse signal $C_2$ to the gate circuit 10G and control signals S to the inverter 4, respectively. The transistor 103 of the gate circuit 10G is turned on by the control circuit 9 upon commutation, when the D.C. voltage $E_d$ applied to the inverter as mentioned above is to be stepped up, to thereby set the voltage doubler rectifier circuit 10 in the active state.

Figure 8:
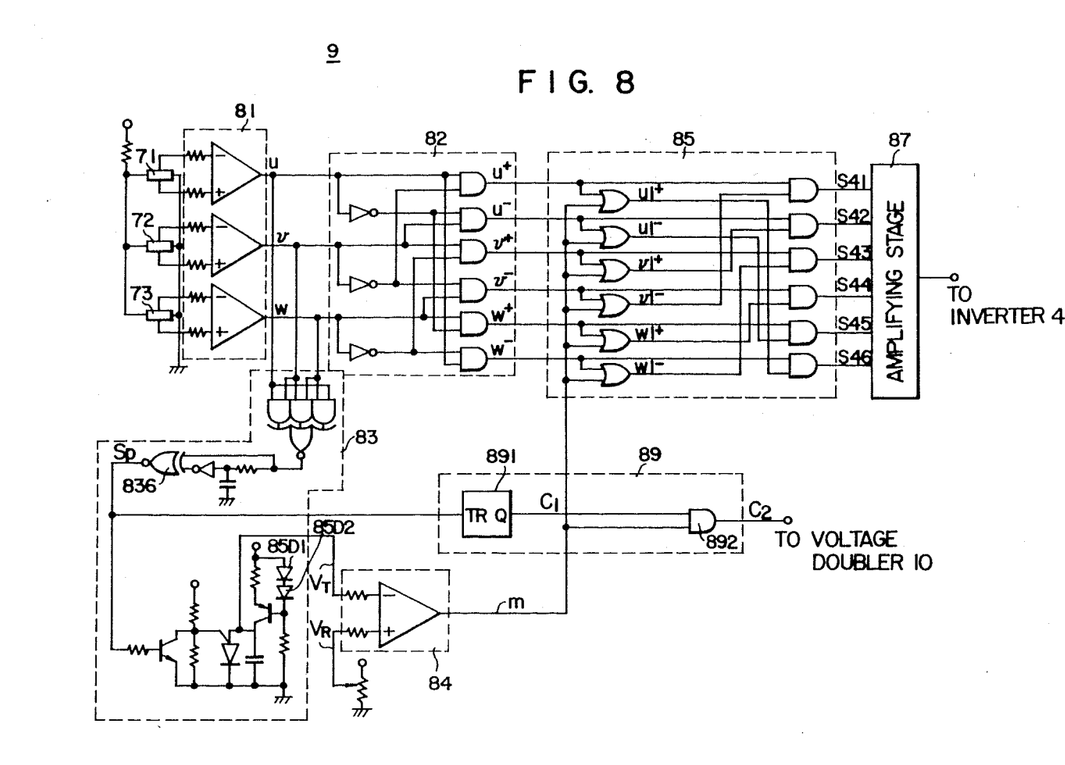
FIG. 8 is a circuit diagram showing a main portion of the embodiment shown in FIG. 7.

FIG. 8 shows in detail a circuit arrangement of the controller 9 which differs from the controller 8 of the configuration shown in FIG. 2 in respect that a gate pulse generator circuit 89 is additionally provided for generating a gate pulse signal $C_2$ in accordance with the output signal $S_p$ of the triangular wave generating circuit 83 and the output signal m of the modulation signal forming circuit 84. Circuit arrangements of the waveform shaping circuit 81, the distributor circuit 82, the modulation signal forming circuit 84, the commutation signal generating circuit 85 and the amplifying stage 87 are similar to those shown in FIG. 2. The output signal waveforms of these circuits 81 to 85 are therefore such as shown in FIG. 3 at u, v, w, $u^+$, $u^-$, $v^+$, $v^-$, $w^+$, $w^-$, $S_p$, $V_T$, $V_R$, m and S41 to S46.

Figure 9:
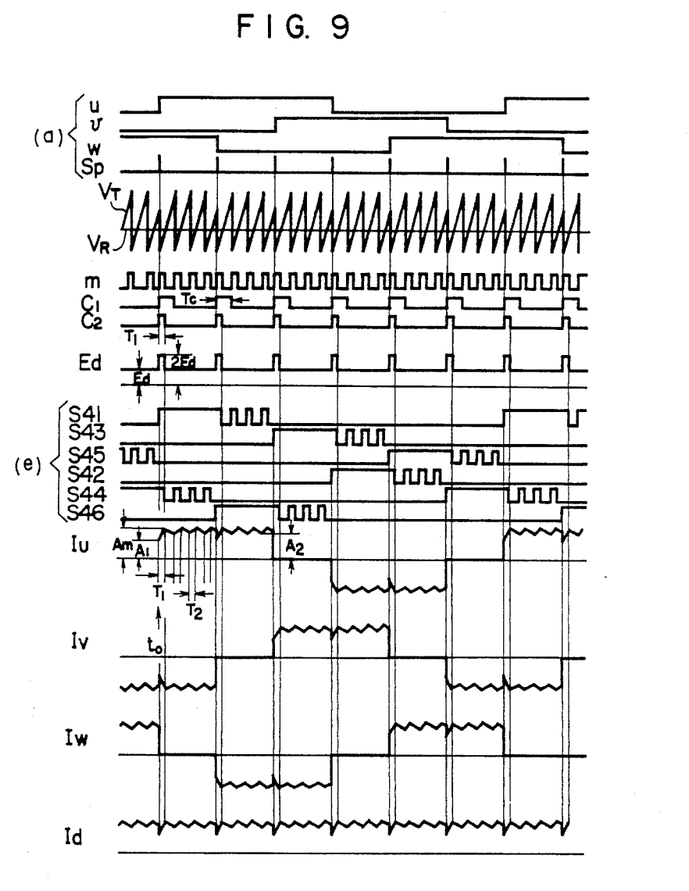
FIG. 9 is a view illustrating waveforms of several signals observed in the controller shown in FIG. 8 together with waveforms of the phase current of the motor produced in the system employing the controller shown in FIG. 8.

The gate pulse generating circuit 89 includes a one-shot multivibrator 891 and an AND circuit 892. The output signal $S_p$ produced by the NOR circuit 836 of the triangular wave generating circuit 83 is supplied to an input terminal TR of the one-shot multivibrator 891 whose output terminal Q is connected to a first input terminal of the AND circuit 892. The output signal m of the modulation signal forming circuit 84 are utilized not only for producing the commutation signals S41, ..., S46, as described hereinbefore in conjunction with FIG. 2, but also supplied to a second input terminal of the AND circuit 892 of the gate pulse generating circuit 89 in the case of the instant embodiment. The output signals of the one-shot multivibrator 891 and the AND circuit 892 have waveforms shown in FIG. 9 at $C_1$ and $C_2$, respectively. Waveforms u, v, w, $V_T$, $V_R$, m and S41 to S46 shown in FIG. 9 are same as those shown in FIG. 3. The gate pulse signal is the one which is supplied to the transistor 103 of the gate circuit 10G shown in FIG. 7. For a time $T_1$ in which the signal $C_2$ is present, the D.C. voltage applied to the inverter 4 is increased to $2E_d$, as described below.

FIG. 9 shows waveforms of phase currents flowing in phases U, V and W of the motor 5 upon commutating operation of the inverter 4 brought about when the commutation signals S41, ..., S42 and the gate pulse signal $C_2$ available in the embodiment shown in FIG. 8 are supplied to the inverter 4. As elucidated hereinbefore in conjunction with FIG. 4, three control signals each including a plurality of pulse trains are produced in correspondence to each phase of the motor on the basis of the commutation signals S41, ..., S46 supplied to the inverter 4 from the controller 9 also in the case of the instant embodiment, wherein each of the pulse trains comprises four pulses. Among these pulses, the first is in synchronism with the synchronizing pulse $S_p$ and utilized for effecting the commutating operation of the inverter 4. In the instant embodiment, the gate circuit 10G is set to the conducting state by the gate pulse signal $C_2$ which is a signal representative of the logical product of the modulated signal m and the signal $C_1$ which rises up in synchronism with initiation of the pulse utilized for the commutation and having a duration not shorter than the duration $T_{on}$ of the pulse included in the pulse train, i.e. the duration $T_1$, whereby the output voltage $2E_d$ from the voltage doubler rectifier circuit 10 is applied to the inverter during a period determined by the pulse duration of the gate pulse $C_2$ and beginning with a time point at which the commutation is initiated. This means that the time integration value of each phase current of the motor is increased from the switching time point of the phase currents, whereby the time required for each phase current to rise up is shortened.

Taking as example the phase current $I_U$ shown in FIG. 9, the commutation signals S41 and S42 are at high level upon commutation during a period from $t_o$ to $T_1$, as is illustrated in FIG. 9 at (e). Accordingly, the transistors 41 and 44 of the inverter circuit 4 shown in FIG. 7 are turned on, resulting in that currents are supplied to the phases U and V of the motor 5. Since the gate pulse signal $C_2$ is at high level at that time as shown in FIG. 9, the transistor 103 shown in FIG. 7 becomes conductive, whereby the D.C. voltage applied to the inverter is increased to $2E_d$ by the voltage doubler rectifier circuit 10. Consequently, the gradient or slope of the rise-up of the phase current $I_U$ shown in FIG. 9 is increased to $(A_m - A_1)/T_1$ because of the D.C. voltage having been doubled. Subsequently, the signal $C_2$ is cut off, whereupon the D.C. voltage is again decreased to the level $E_d$ accompanied by the current ripple having a gradient expressed by $(A_m - A_2)/T_2$, where $T_2$ is equal to $T_1$. In above expressions, $A_m$ represents the maximum value or level of the current ripple, $A_1$ represents the minimum value of the current ripple upon commutation, and $A_2$ represents the minimum level of the current ripple after the commutation.

In FIG. 9, $I_d$ represents the D.C. input current to the inverter and corresponds to the sum of the absolute values of all the phase currents.

As will be appreciated from the above description, the brushless motor can be driven with the current pulsation being suppressed to minimum.

When the current drop or falling upon commutation is of great magnitude so that the ripple is too large to be suppressed by the single gate pulse signal $C_2$ in the embodiment described above, the duration $T_c$ of the output signal $C_1$ of the multivibrator 891 of the gate pulse generator 89 may be made so long that the doubled voltage $2E_d$ is applied from the voltage doubler rectifier circuit 10 during several pulse durations of the modulated signal m. Then, the current pulsation can further be decreased.

In the case of the embodiment described above, a voltage doubler circuit is employed as the additional high voltage power source independent of the inherent D.C. power supply source. However, the invention is never restricted to the use of the doubled voltage, but other D.C. voltage can be used for the same purpose, so far as it is higher than the voltage $E_d$.

Figure 10:
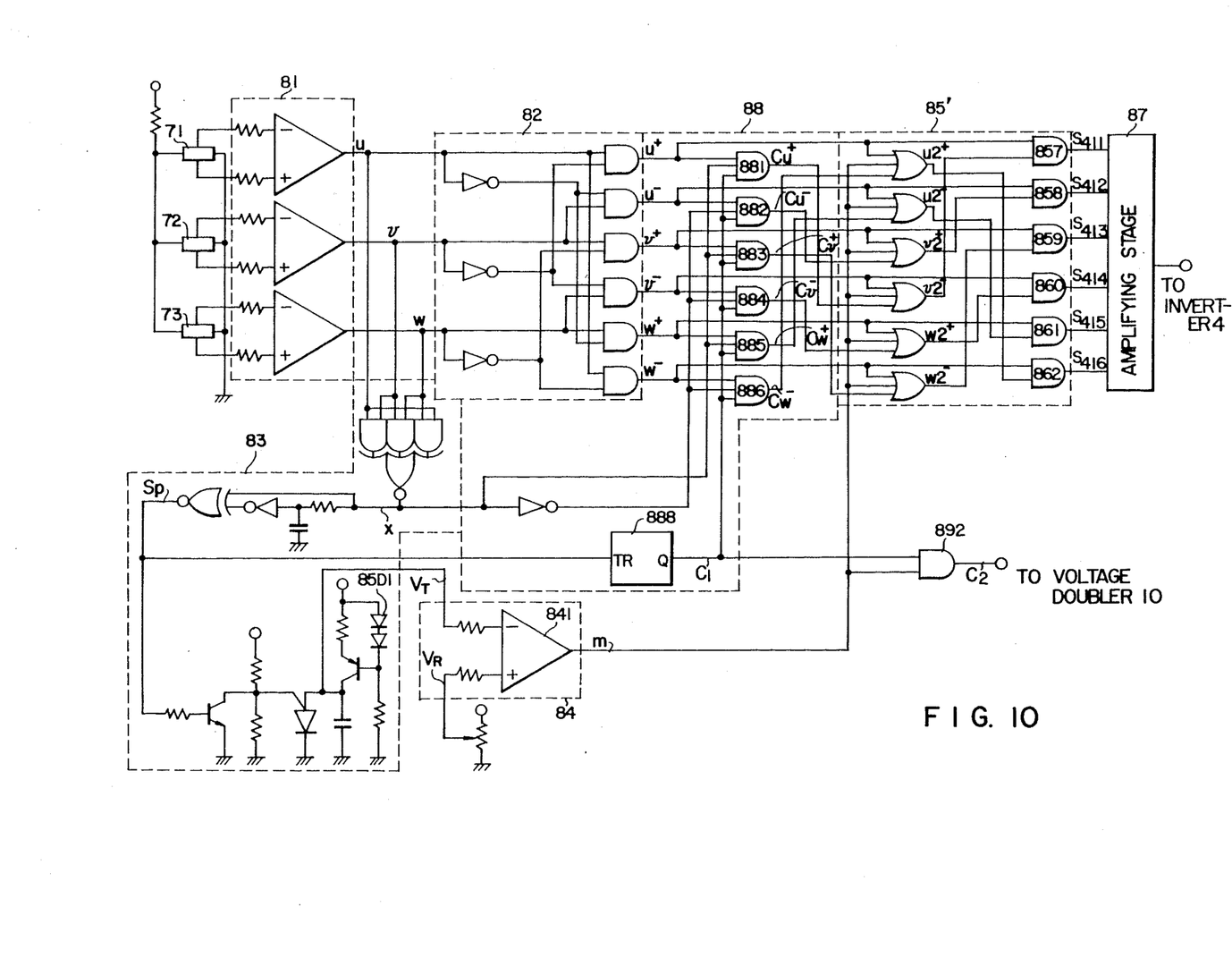
FIG. 10 is a circuit diagram showing a main portion of a further embodiment of the present invention.

FIG. 10 shows still another embodiment of the invention which differs from the apparatus shown in FIG. 7 in respect that the controller 9 is constituted by the hitherto known controller shown in FIG. 2 which is however additionally imparted with both functions of the pulse duration extension circuit 88 shown in FIG. 5 and the gate pulse generating circuit 89 shown in FIG. 8. More specifically, the one-shot multivibrator 888 of the extension circuit 88 can be employed together with the one-shot multivibrator 891 of the gate pulse generating circuit 89. For this reason, the output terminal Q of the multivibrator 888 is connected not only to the third input terminals of the AND circuits 881, ..., 886, respectively, but also to the first input terminal of the AND circuit 892. Further, the output signal m of the modulation signal forming circuit 84 is supplied to the second input terminal of the OR circuits 851', ..., 856', respectively, of the commutation signal generating circuit 85' and additionally to the second input terminal of the AND circuit 892. In other respects, the circuit arrangement may be similar to the one shown in FIG. 5.

According to the embodiment shown in FIG. 10, the time integration value of the phase currents of the motor 5 from the switching time point thereof is further increased, whereby the torque ripple can be suppressed more effectively.

We claim:

1. An apparatus for driving a polyphase brushless motor with a suppressed torque ripple, said brushless motor having a rotor, the apparatus comprising:
   sensor means for detecting the angular position of the rotor of said brushless motor;
   a controller responsive to the output of said sensor means for generating a control signal containing trains of pulses for each phase of said motor; and
   an inverter subject to commutation under control of said control signal from said controller for effecting switching among motor phase electric currents to selectively conduct electric current from a power source to each phase of said motor on the basis of said pulse trains;
   wherein said controller includes means for increasing the value of integration of the electric current for each phase of said motor with respect to time between two instants of successive commutation for said motor phase electric current switching.

2. An apparatus according to claim 1, in which said means for increasing the integration value includes means for increasing the duration of each of those pulses in said pulse trains with which said commutation is effected.

3. An apparatus according to claim 2, in which the apparatus further comprises means for stepping up the voltage of said power source and a gate circuit connected between said voltage step-up means and said inverter, and said means for increasing the integration value further includes means for generating a gate pulse signal in synchronism with the initiation of each of those pulses in said pulse trains with which said commutation is effected, the duration of each of said gate pulse signals being not smaller than that of each pulse in said pulse trains, said gate pulse signal generating means being coupled to said gate circuit to render the latter conductive only during the presence of said gate pulse signal.

4. An apparatus according to claim 1, in which the apparatus further comprises means for stepping up the voltage of said power source and a gate circuit connected between said voltage step-up means and said inverter, and said means for increasing the integration value includes means for generating a gate pulse signal in synchronism with the initiation of each of those pulses in said pulse trains with which said commutation is effected, the duration of each of said gate pulse signals being not smaller than that of each pulse in said pulse trains, said gate pulse signal generating means being coupled to said gate circuit to render the latter conductive only during the presence of said gate pulse signal.

5. An apparatus for driving a polyphase brushless motor, said brushless motor having a rotor, the apparatus comprising:
   sensor means for detecting the angular position of the rotor of said brushless motor;
   a controller responsive to the output of said sensor means for generating a control signal containing trains of pulses for each phase of said motor; and
   an inverter subject to commutation under control of said control signal from said controller to selectively conduct electric current from a power source to each phase of said motor for a current conduction period defined by said pulse trains,
   wherein said controller includes means for increasing the value of integration of the electric current for each phase of said motor with respect to time during that portion of the current conduction period for each phase of said motor during which the absolute value of the electric current is initially increasing in said conduction period, whereby torque ripple ascribable to the switching of the phase electric currents of said motor effected through the commutating operation of said inverter is suppressed.

6. An apparatus according to claim 5, wherein said means for increasing the integration value includes means for increasing the duration of each of the pulses in said pulse trains with which said commutation is effected.

7. An apparatus according to claim 6, further comprising means for stepping up the voltage of said power source, and a gate circuit connected between said voltage step-up means and said inverter, said means for increasing the integration value further includes means for generating a gate pulse signal in synchronism with the initiation of each of the pulses in said pulse trains with which said commutation is effected, the duration of each of said gate pulse signals being not smaller than that of each pulse in said pulse trains, said gate pulse signal generating means being coupled to said gate circuit to render the latter conductive only during the presence of said gate pulse signal.

8. An apparatus according to claim 5, further comprising means for stepping up the voltage of said power source, and a gate circuit connected between said voltage step-up means and said inverter, said means for increasing the integration value includes means for generating a gate pulse signal in synchronism with the initiation of each of the pulses in said pulse trains with which said commutation is effected, the duration of each of said gate pulse signal being not smaller than that of each pulse in said pulse trains, said gate pulse signal generating means being coupled to said gate circuit to render the latter conductive only during the presence of said gate pulse signal.

9. In an apparatus for driving a polyphase brushless motor having a rotor including sensor means for detecting the angular position of the rotor of said brushless motor, a controller responsive to the output of said sensor means for generating a control signal containing trains of pulses for each phase of said motor, and an inverter subject to commutation under control of said control signal from said controller for effecting switching among motor phase electric currents to selectively conduct electric current from a power source to each phase of said motor for a current conduction period defined by said pulse trains with the absolute value of the electric current increasing substantially linearly in said conduction period so that a torque ripple ascribable to the switching of the phase electric currents of said motor effected through the commutating operation of said inverter is provided, the improvement comprising said controller incuding means for suppressing said torque ripple.

10. An apparatus according to claim 9, wherein said means for suppressing said torque ripple includes means for increasing the amplitude of the absolute value of the phase current during said current conduction period at the initial portion of said current conduction period so that the amplitude of the absolute value of the phase electric current during said current conduction period is substantially constant.

11. An apparatus according to claim 10, wherein said means for increasing the amplitude includes means for increasing the value of integration of the current for each phase of said motor with respect to time in said current conduction period.

12. An apparatus according to claim 11, wherein said means for increasing the integration value includes means for increasing the duration of each of the pulses in said pulse trains with which said commutation is effected.

13. An apparatus according to claim 12, further comprising means for stepping up the voltage of said power source, and a gate circuit connected between said voltage step-up means and said inverter, said means for increasing the integration value further includes means for generating a gate pulse signal in synchronism with the initiation of each of the pulses in said pulse trains with which said commutation is effected, the duration of each of said gate pulse signals being not smaller than that of each pulse in said pulse trains, said gate pulse signal generating means being coupled to said gate circuit to render the latter conductive only during the presence of said gate pulse signal.

14. An apparatus according to claim 11, further comprising means for stepping up the voltage of said power source, and a gate circuit connected between said voltage step-up means and said inverter, said means for increasing the integration value includes means for generating a gate pulse signal in synchronism with the initiation of each of the pulses in said pulse trains with which said commutation is effected, the duration of each of said gate pulse signals being not smaller than that of each pulse in said pulse trains, said gate pulse signal generating means being coupled to said gate circuit to render the latter conductive only during the presence of said gate pulse signal.

* * * * *